(No Model.)
E. THOMSON.
MANUFACTURE OF BANDS, RINGS, &c., BY ELECTRICITY.
No. 432,656. Patented July 22, 1890.
Fig. 1.
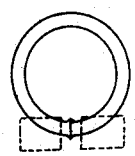
Fig. 2.
Fig. 3.
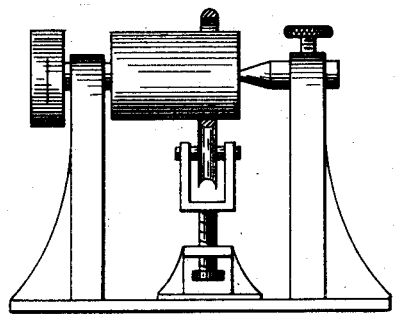
Fig. 4.
Fig. 6.
Fig. 5.
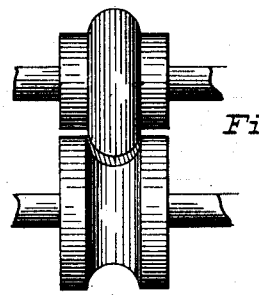
Fig. 7.
Fig. 8.
Fig. 9.
ATTEST:
J. Hurdly
Jno. H. Capes
INVENTOR:
Elihu Thomson
By H. C. Townsend
Attorney

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

MANUFACTURE OF BANDS, RINGS, &c., BY ELECTRICITY.

SPECIFICATION forming part of Letters Patent No. 432,656, dated July 22, 1890.

Application filed April 16, 1890. Serial No. 348,191. (No model.)

*To all whom it may concern:*

Be it known that I, ELIHU THOMSON, a citizen of the United States, and a resident of Lynn, in the county of Essex and State of Massachusetts, have invented certain new and useful Improvements in the Manufacture of Bands, Rings, &c., of which the following is a specification.

My invention relates to the production of bands, rings, or other endless forms of metal; and it consists in an improved process or method of manufacture in which my electric welding process and the mechanical operation of rolling or compressing or swaging metals are employed in a particular manner as steps of the manufacture, whereby I am enabled to secure advantages not otherwise obtainable.

In carrying out my invention I first produce, by the electric welding process, and preferably by butt-welding, a metal ring or blank of closed or endless form and of any desired or convenient shape approximating more or less closely in external dimensions or form and in cross-section the ultimate shape or form desired. I find in practice that in the ordinary butt-welding of rings or other endless forms the work is far more successfully and easily done by keeping the section operated upon of regular form, or at least a form in which the body of the metal is not spread out, but kept fairly close together. Hence in my present invention I preferably begin with a blank cut from a rectangular, square, or round section of bar bent up so that its ends meet and electrically welded by the butt-welding process, preferably.

The ring or endless piece might obviously be formed from two pieces instead of from one, the only difference being that there would be in the case of two pieces two joints or welds, formed preferably at diametrically-opposite points, and preferably simultaneously, as shown in my Patent for making chains, No. 385,385, dated July 3, 1888. After making the endless form or blank by this process and from one or more pieces, as described, I roll, compress, or swage the blank, so as to produce the desired shape in cross-section, and at the same time, if desired, expand or contract the blank, ring, or other endless form in its circumferential dimensions.

In this operation the ring may be operated upon cold when the metal admits of cold working; but when it is too rigid it may be heated to any desired degree before the finishing process.

In the accompanying drawings and subjoined description I have set forth the application of the invention to such articles as rings, tires, bands, &c., from which its application to other shapes or articles will be obvious.

In the drawings, Figures 1, 2, and 3 illustrate stages of the process as applied to the production of rings. Figs. 4, 5, and 6 illustrate the production of tires, and Figs. 7, 8, and 9 of expansion-joints.

As an illustration of the application of my invention to the production of rings, I will take the case of a plain gold finger-ring. In this case I take a round gold wire, Fig. 1, weld into a closed ring, Fig. 2, by my electric welding process, as exemplified in Patents Nos. 347,140, 347,141, and 347,142, and subsequent thereto put the ring into an apparatus which rolls it and expands it, converting the round section into the desired shape of section. At the same time I am enabled by this rolling process to remove the effect of annealing the stock which takes place at or near the portions which have been united or welded electrically and give elasticity to the whole ring. I prefer, in fact, to start with annealed wire, make the closed ring, and then roll or hammer it or otherwise work it, as on a mandrel, Fig. 3, to give it the desired shape of section, the desired elasticity or hardness, and the desired diameter.

My invention is also applicable to the manufacture of articles which are ordinarily difficult to make on account of the union having to be made after the final shape has been given. I may take a rectangular section strip of steel, Fig. 4, and uniting the ends electrically weld them together, making an endless band. I may then roll this band between two rollers, Fig. 5, one having a convex and the other a concave face, giving the band a section, as shown in Fig. 6, and thereby producing an easily-made bicycle-wheel rim.

Fig. 7 illustrates another article to the manufacture of which my invention may be most advantageously applied—namely, the production of expansion-joints for steam-piping. In this case I electrically weld the butting ends of the strip of iron or steel, Fig. 8, and afterward corrugate the same, with the ridges and depressions running parallel to the circumference, using rollers of a pattern shown in Fig. 9.

It will be evident that in the practice of my invention I may produce new objects of manufacture. I may even take metals which are not capable of being welded in the fire, beginning with straight rods or blanks of same, producing a homogeneous ring and finally finishing into the desired shape, thus attaining a result never before produced in the art. In the case of those metals which are ordinarily weldable the result is equally novel on account of the structure which is imparted to the material, the rings being formed by the welding of the pieces in abutment while electrically heated, giving a homogeneous strong joint, with the fiber or grain of the ends projecting toward each other, and the subsequent rolling process further perfecting the lay and grain of the pieces. I am thus enabled to produce rings or endless bands of all shapes and sections in which the joint is undiscoverable, and to apply the operation to the whole range of metals or to include in the same ring several different metals united end to end.

What I claim as my invention is—

1. The herein-described improvement in manufacturing metal rings, bands, or other endless shapes of metal, consisting in making a blank of endless form by the electric welding process, and subsequently swaging, rolling, or pressing the blank, so as to produce the desired shape in cross-section.

2. The herein-described improvement in manufacturing metal rings, bands, or other endless shapes of metal, consisting in making a blank of endless form of one or more pieces of metal joined by butt-welding in the electric welding process, and subsequently swaging, rolling, or pressing the blank, so as to produce the desired shape in cross section.

3. The herein-described improvement in manufacturing metal rings, bands, or other endless shapes of metal, consisting in bending one or more pieces of metal, abutting the ends, uniting such ends by the electric welding process, so as to form a blank of endless form, and afterward rolling or compressing the blank to harden the same and perfect the grain or lay of the metal at the joint.

4. The herein-described improvement in manufacturing bands, rings, or other endless shapes of metal, consisting in taking rods, bars, or pieces of the desired material, producing a homogeneous ring or blank therefrom by the electric welding process, and finally finishing into the desired shape.

5. The herein-described improvement in producing metal rings, bands, or other endless shapes of metal, consisting in taking a metal rod, bar, or piece of metal the section of which is compact or approaches, as described, as nearly as may be a square or round section, bending the metal so that its ends will abut, then electrically welding such ends together, and finally rolling, compressing, or swaging the metal into any desired shape in cross-section.

6. The herein-described improvement in making metal rings, bands, or other endless shapes of metal, consisting in taking one or more rods or pieces of the desired material, welding the ends of such piece or pieces together by the electric welding process, so as to form a continuous or endless metal blank, and subsequently finishing the metal blank by the desired rolling, compressing, swaging, or other mechanical operation.

Signed at Lynn, in the county of Essex and State of Massachusetts, this 12th day of April, A. D. 1890.

ELIHU THOMSON.

Witnesses:
JOHN W. GIBBONEY,
DUGALD MCKILLOP.